United States Patent [19]

Kawahara

[11] Patent Number: 5,568,193
[45] Date of Patent: Oct. 22, 1996

[54] IMAGE PICKUP DEVICE PROVIDING ENHANCED HORIZONTAL BANDWIDTH

[75] Inventor: Norihiro Kawahara, Kawasaki, Japan

[73] Assignee: Canon Kabushiki Kaisha, Tokyo, Japan

[21] Appl. No.: 524,233

[22] Filed: Sep. 6, 1995

[30] Foreign Application Priority Data

Sep. 9, 1994 [JP] Japan .................................. 6-216324

[51] Int. Cl.$^6$ .............................. H04N 9/07; H04N 5/228
[52] U.S. Cl. ........................ 348/222; 348/266; 348/279; 348/272
[58] Field of Search ..................................... 348/222, 266, 348/272, 277, 278, 279; 358/43, 44; H04N 5/228, 9/07, 9/04, 9/083

[56] References Cited

U.S. PATENT DOCUMENTS 4,246,601 1/1981 Sato .......................................... 348/277
5,170,249 12/1992 Ohtsubo .................................. 348/222

*Primary Examiner*—Safet Metjahic
*Assistant Examiner*—Sherrie Hsia
*Attorney, Agent, or Firm*—Robin, Blecker, Daley & Driscoll

[57] ABSTRACT

To obtain an image pickup device capable of obtaining wide-band R, G, and B signals, R, G, and B signals are generated by a coincidence and matrix circuit using Ye/Cy and Mg/G components of outputs from an image pickup element in units of pixels. A wide-band signal generation circuit generates wide-band signal components from another arithmetic operation using the outputs from the image pickup element. The resultant wide-band signal components are mixed with the R, G, and B signals using an adder and a subtracter, thereby obtaining wide-band R, G, and B signals. Therefore, the wide-band R, G, and B signals suitable for multimedia applications and free from color blurring at a high resolution can be obtained.

5 Claims, 10 Drawing Sheets

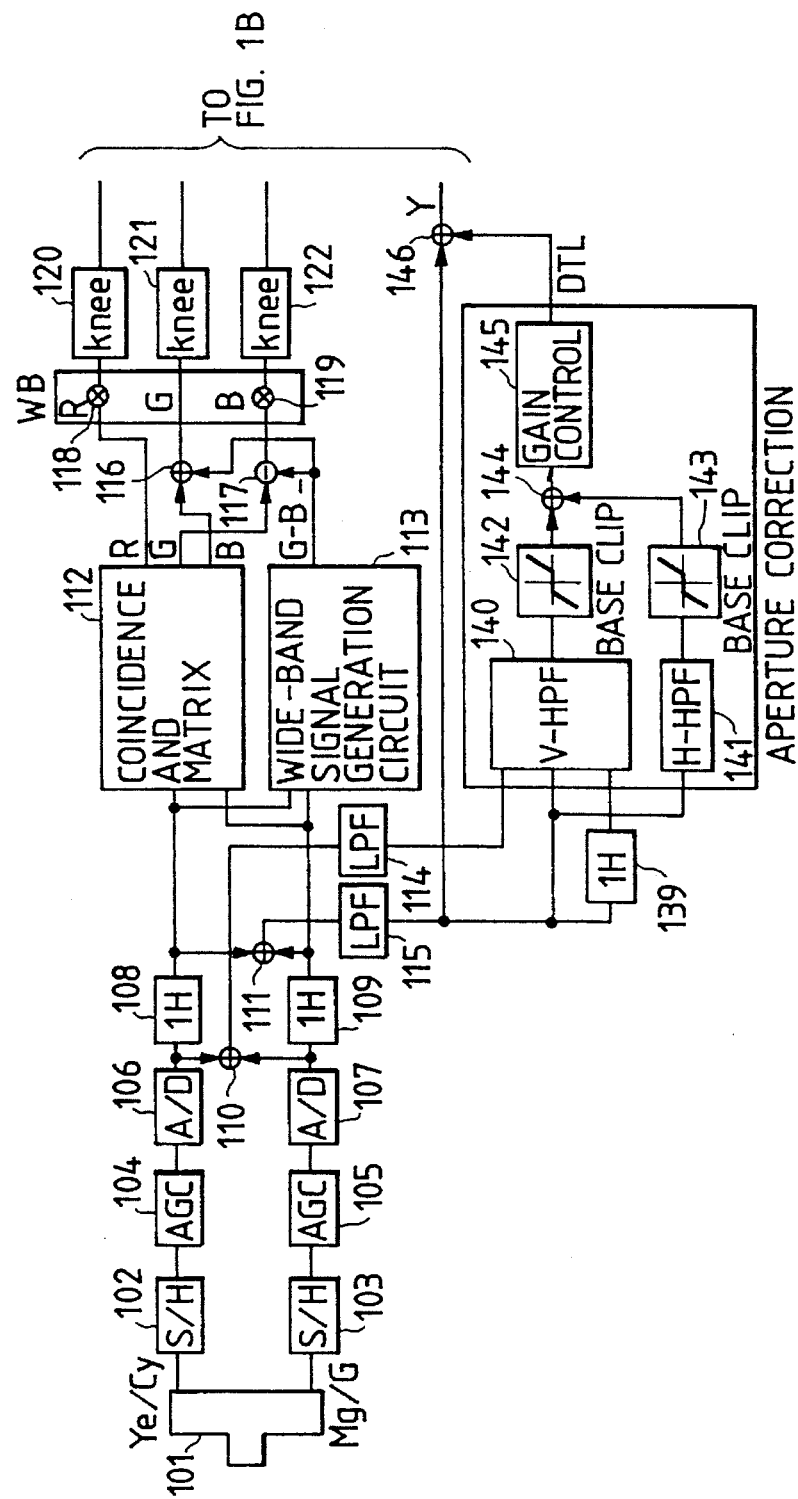

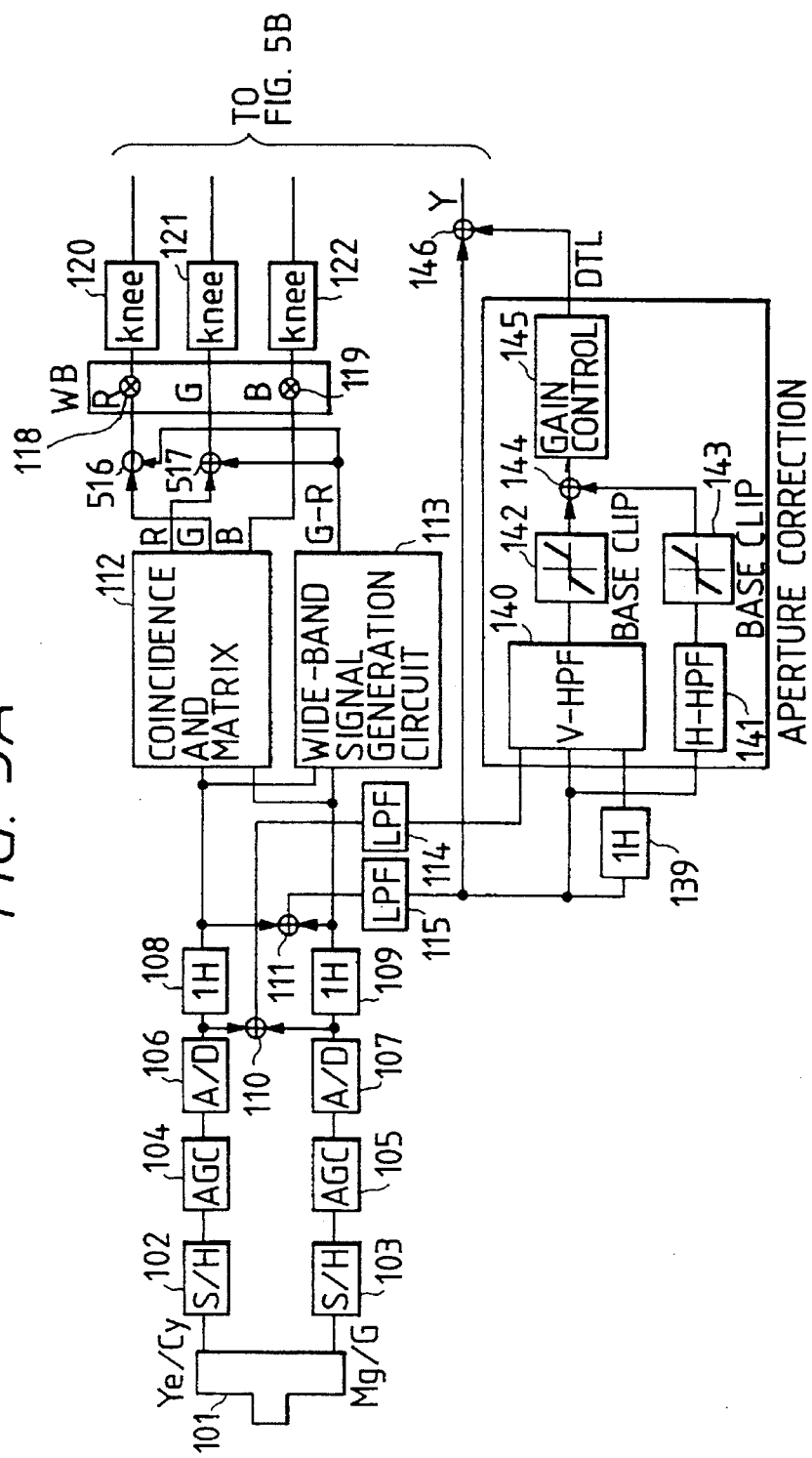

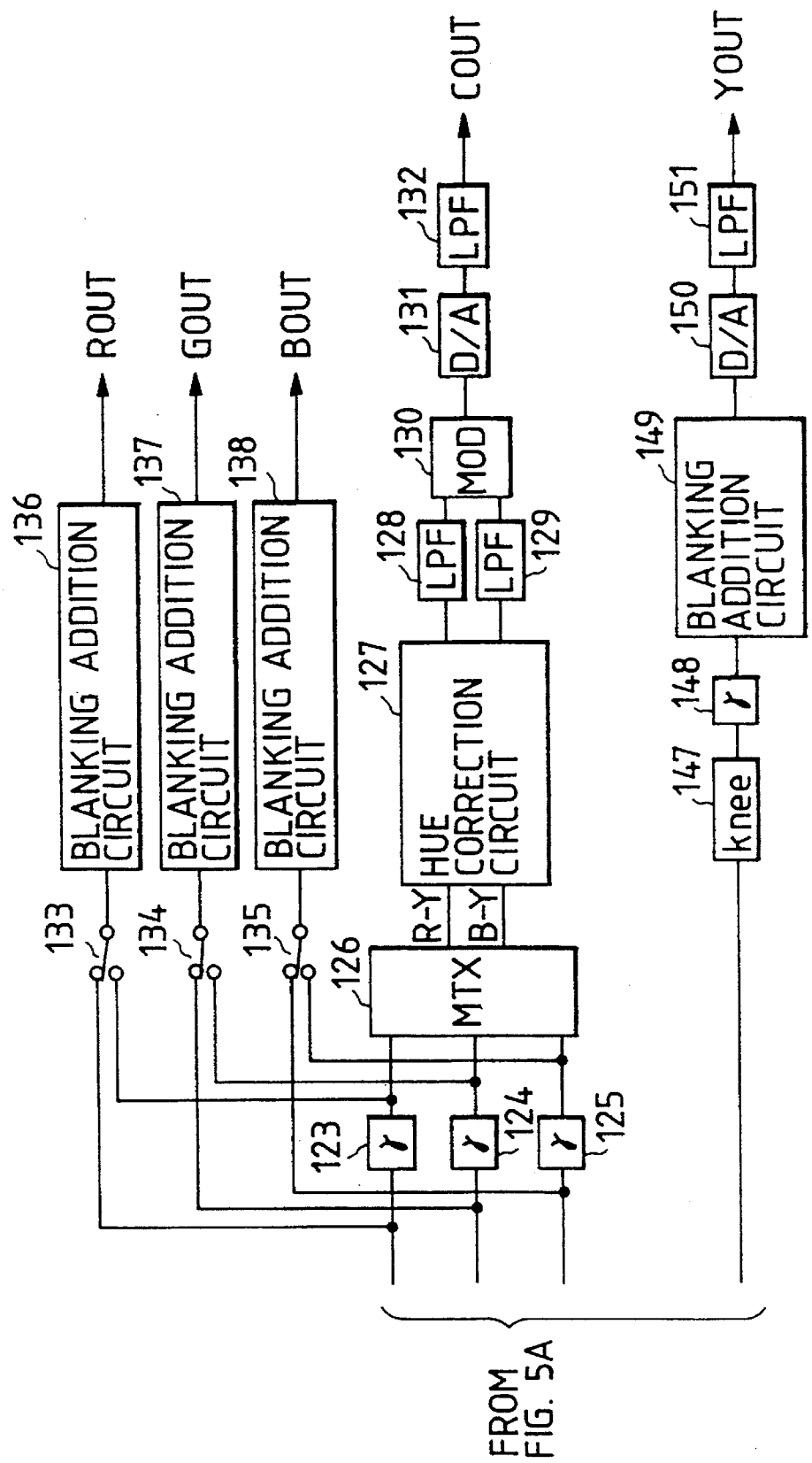

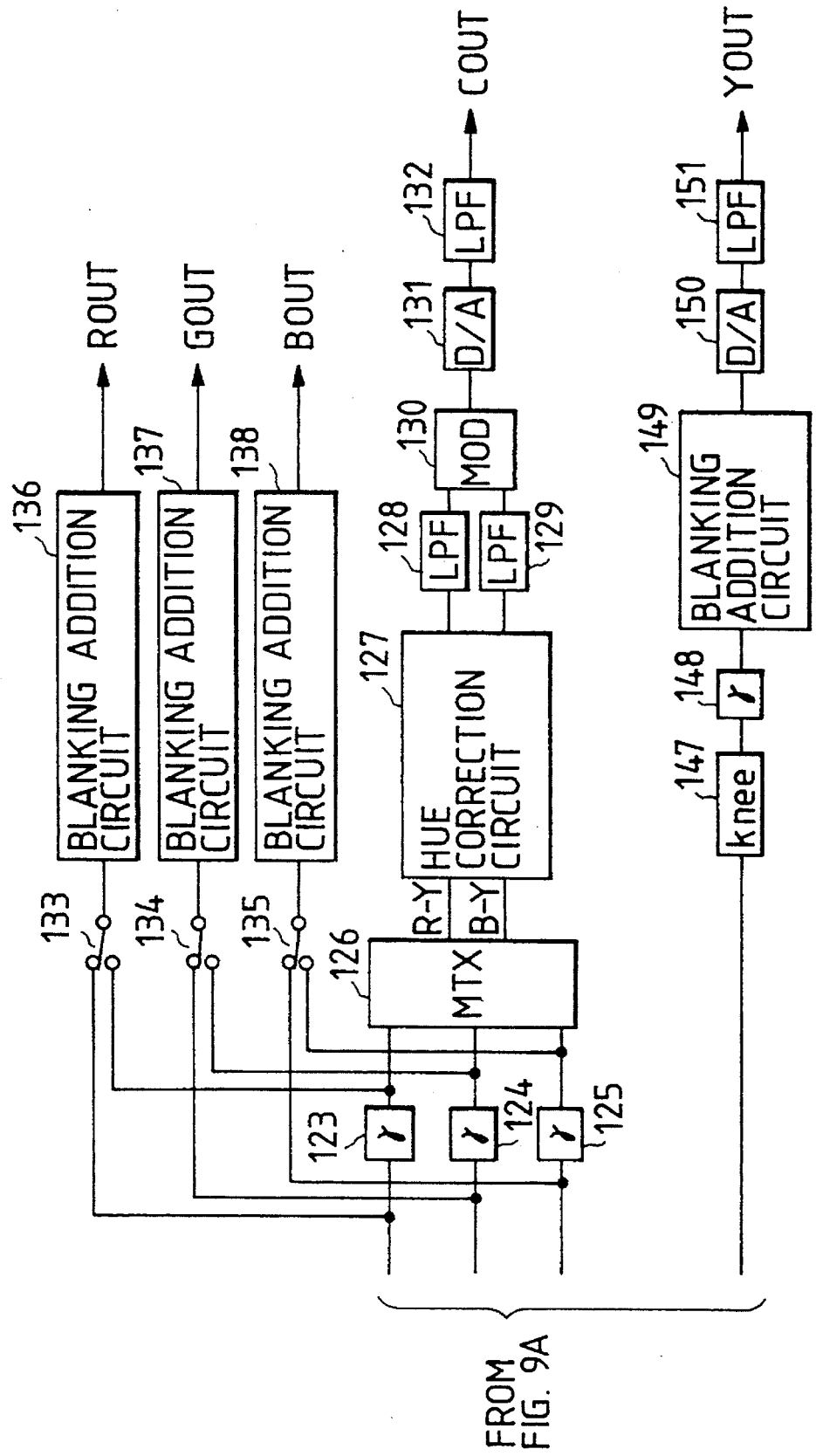

IMAGE PICKUP DEVICE PROVIDING ENHANCED HORIZONTAL BANDWIDTH

BACKGROUND OF THE INVENTION

1. Field of the Invention

The present invention relates to an image pickup device using an image pickup element such as a CCD.

2. Related Background Art

The system of a conventional image pickup device is shown in FIG. 9 which comprised of FIGS. 9A and 9B. Color filters are independently arranged for odd and even fields of interlaced scanning in an image pickup element 101, as shown in FIG. 4. Ye and Cy are read from VOUT1 every other pixel, and Mg and G are read from VOUT2 every other pixel.

Signals of these two systems are sample-held by S/H circuits 102 and 103 and AGC-controlled by AGC circuits 104 and 105, respectively. The AGC-controlled signals are converted into digital signals by analog-to-digital (A/D) converters 106 and 107. These digital signals are subjected to Ye+Mg and Cy+G calculations performed every other pixel in an adder 110 to obtain a luminance signal. Outputs from the A/D converters 106 and 107 are delayed by memories (1Hs) 108 and 109 each having a capacity of one horizontal period (to be referred to as a 1H hereinafter) of a television signal.

Outputs from the memories 108 and 109 are subjected to Ye+Mg and Cy+G calculations performed every other pixel in an adder 111, thereby obtaining a luminance signal. The color carriers of outputs from the adders 110 and 111 are removed by low-pass filters (LPFs) 114 and 115. An output from the low-pass filter 115 is delayed by a memory (1H) 139 having a 1H capacity.

The outputs from the low-pass filters 114 and 115 and the output from the memory 139 constitute continuous 3H luminance signals. The high-frequency components of these signals are removed by a high-pass filter (V-HPF) 140. The noise component of an output from the high-pass filter 140 is removed by a base clip circuit 142 to obtain a vertical aperture signal. The high-frequency component of the output from the low-pass filter 115 is removed by a high-pass filter (H-HPF) 141. The noise component of an output from the high-pass filter 141 is removed by a base clip circuit 143 to obtain a horizontal aperture signal. The vertical and horizontal aperture components are added by an adder 144, and the signal level of the sum from the adder 144 is controlled by a gain control circuit 145, thereby obtaining a detail signal (DTL). An adder 146 adds this detail signal to the output from the low-pass filter 115 which is phase-locked by a delay element (not shown), thereby realizing aperture correction of the luminance signal.

The gain of the high-frequency component of the aperture-corrected luminance signal Y is suppressed by a knee circuit 147. An output from the knee circuit 147 is gamma-corrected by a gamma correction circuit (γ) 148. A blanking signal is added to a gamma-corrected signal in a blanking addition circuit 149. An output from the blanking addition circuit 149 is converted into an analog signal by a digital-to-analog (D/A) converter 150. The analog signal passes through a low-pass filter (LPF) 151 to obtain a video luminance signal YOUT.

The outputs from the memories 108 and 109 are subjected to the coincidence of Ye, Cy, Mg, and G components and the following matrix operation in a first coincidence and matrix circuit 112 to obtain R, G, and B signals as follows:

$$\begin{pmatrix} R \\ G \\ B \end{pmatrix} = \begin{pmatrix} A_{11} & A_{12} & A_{13} & A_{14} \\ A_{21} & A_{22} & A_{23} & A_{24} \\ A_{31} & A_{32} & A_{33} & A_{34} \end{pmatrix} = \begin{pmatrix} Ye \\ Cy \\ Mg \\ G \end{pmatrix} \quad (1)$$

The gains of the R and B components are controlled by multipliers 118 and 119 in a white balance circuit (WB) with reference to the G component, thereby obtaining a good white balance. The gains of the high-level components are suppressed by knee circuits 120 to 122. Outputs from the knee circuits 120 to 122 are gamma-corrected by gamma correction circuits (γ) 123 to 125. In addition, a second matrix circuit (MTX) 126 performs a matrix operation to generate color difference signals R−Y and B−Y as follows:

$$\begin{pmatrix} R-Y \\ B-Y \end{pmatrix} = \begin{pmatrix} D_{11} & D_{12} & D_{13} \\ D_{21} & D_{22} & D_{23} \\ D_{31} & D_{32} & D_{33} \end{pmatrix} \begin{pmatrix} R \\ G \\ B \end{pmatrix} \quad (2)$$

for Y=0.3R+0.11B in an NTSC signal

The hue components of these color difference signals are corrected in a hue correction circuit 127, and the high-frequency components of the outputs from the hue correction circuit 127 are removed for later modulation by low-pass filters (LPFs) 128 and 129. A modulation circuit (MOD) 130 performs modulation and adds a burst signal to the input signal. An output from the modulation circuit 130 is converted into an analog signal by a D/A converter 131. This analog signal passes through a low-pass filter (LPF) 132 to obtain a video color signal COUT.

The outputs from the knee circuits 120 to 122 and the gamma correction circuits 123 to 125 are supplied to selectors 133 to 135. The selectors 133 to 135 select the outputs from the knee circuits 120 to 122 or the outputs from the gamma correction circuits 123 to 125 in accordance with whether gamma correction is required. Blanking signals are added to the outputs from the selectors 133 to 135 by blanking addition circuits 136 to 138, thus obtaining a digital red signal ROUT, a digital green signal GOUT, and a digital blue signal BOUT, respectively. These digital outputs are input to a multimedia equipment (not shown) such as a computer or a printer.

In the prior art, the R, G, and B components are obtained by a matrix operation of the outputs from the image pickup element. The horizontal band of the R, G, and B outputs is narrowed in consideration of multimedia applications. When these R, G, and B outputs are supplied to a multimedia equipment such as a computer or a printer, a sufficiently high resolution cannot be obtained, and color blurring undesirably occurs.

SUMMARY OF THE INVENTION

The present invention has been made in consideration of and to solve the conventional problems described above, and has as its object to provide an image pickup device in which the band of digital R, G, and B outputs from the image pickup device is widened to obtain a high resolution in outputting the R, G, and B outputs to a multimedia equipment and at the same time prevent color blurring.

According to one aspect of the present invention, there is provided an image pickup device comprising matrix operation means for performing a matrix operation of a video signal from an image pickup element to generate R (red), G (green), and B (blue) signals, wide-band signal generation means for performing signal processing excluding horizontal processing for the video signal to generate a wide-band signal, and mixing means for mixing the wide-band signal to the R, G, and B signals to generate wide-band R, G, and B signals.

According to another aspect of the present invention, there is provided an image pickup device which a first video signal including first and second color component signals from an image pickup element every other pixel and a second video signal including third and four color component signals from the image pickup element every other pixel, converts the first and second video signals into a first digital video signal including first and second digital color component signals and a second digital video signal including third and fourth digital color component signals, and performs signal processing for the first and second digital video signals to output a video luminance signal, a video color signal, and digital R, G, and B signals, comprising matrix operation means for coinciding the first and second digital video signals and performing a matrix operation of the first to fourth digital color component signals to generate R, G, and B signals, and mixing means for generating a wide-band signal component from the first and third color component signals and a wide-band signal component from the second and fourth color component signals and mixing the wide-band signal components to the R, G, and B signals to generate wide-band R, G, and B signals.

According to another aspect, signal processing excluding horizontal processing is performed using the outputs from the image pickup element to obtain a wide-band signal. This wide-band signal is mixed with the R, G, and B signals obtained by the matrix operation to obtain the wide-band R, G, and B signals suitable for multimedia applications.

According to another aspect, the wide-band components are obtained by an operation different from the matrix operation of four pixels from the image pickup element to obtain the R, G, and B components. The resultant wide-band components are mixed with the R, G, and B components to obtain the wide-band digital R, G, and B outputs suitable for multimedia applications.

The above and other objects, features, and advantages of the present invention will be apparent from the detailed description of preferred embodiments in conjunction with the accompanying drawings.

BRIEF DESCRIPTION OF THE DRAWINGS

FIG. 5 which comprised of FIGS. 5A and 5B is a block diagram showing the second embodiment of the present invention;

DETAILED DESCRIPTION OF THE PREFERRED EMBODIMENTS

Figure 1B:
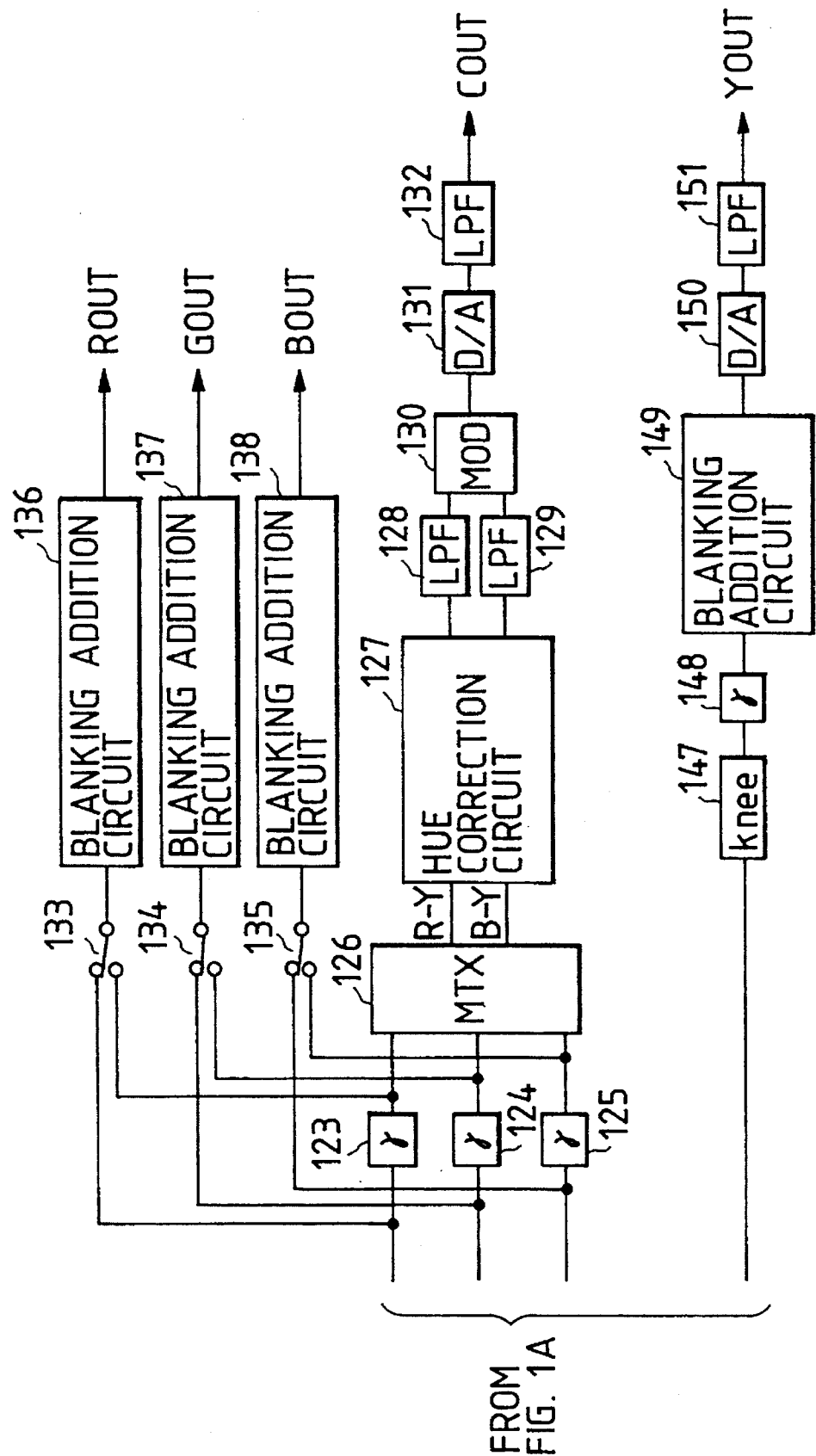
FIG. 1 which comprised of FIGS. 1A and 1B is a block diagram showing the first embodiment of the present invention.
Figures 2, 4:
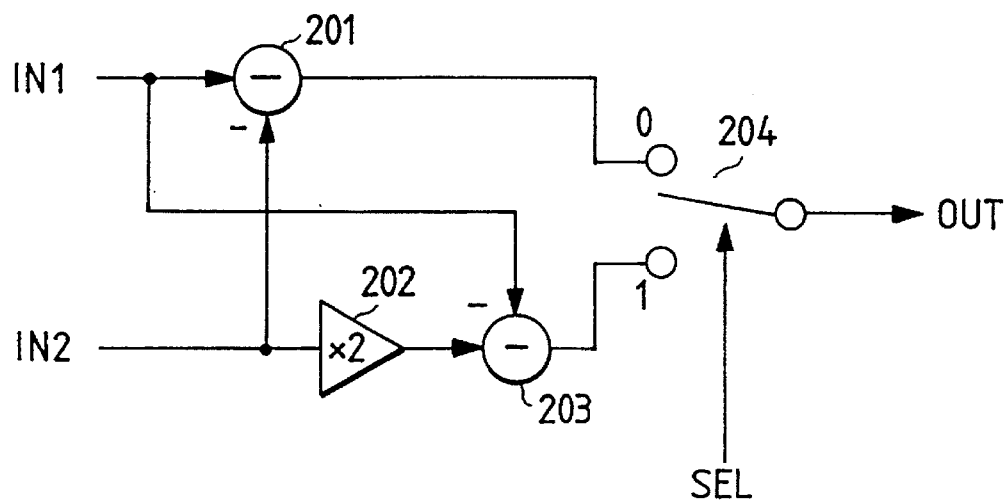
FIG. 2 is a block diagram showing the internal arrangement of a wide-band signal generation circuit.
FIG. 4 is a view showing the pixel layout of a CCD used in the first embodiment.
Figures 9, 9A:
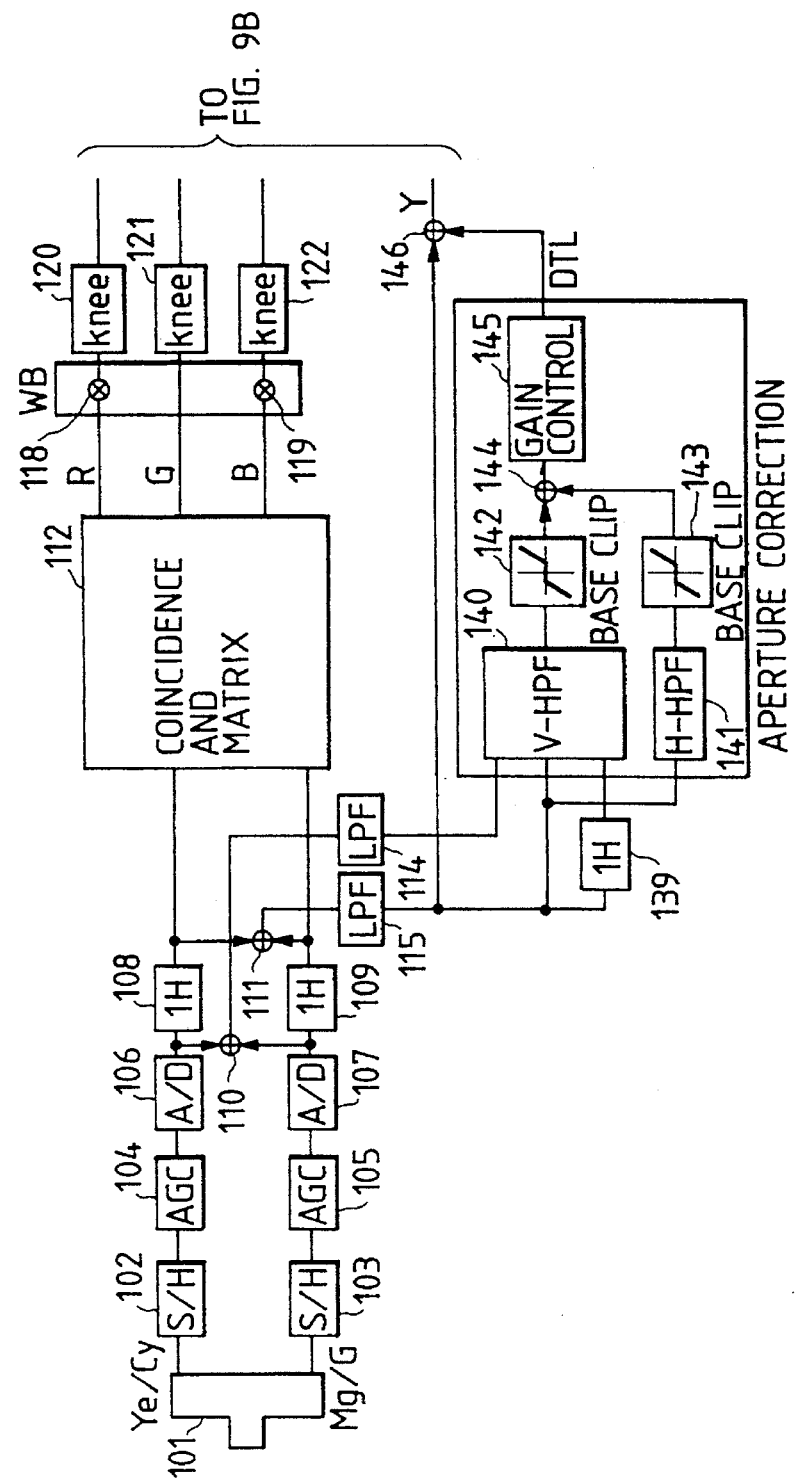
FIG. 9 which comprised of FIGS. 9A and 9B is a block diagram of a conventional image pickup device.

The first embodiment of the present invention will be described with reference to FIG. 1 which comprised of FIGS. 1A and 1B. Referring to FIGS. 1A and 1B, an adder 116 and a subtracter 117 as a mixing means and a wide-band signal generation circuit 113 are added to the arrangement of FIGS. 9A and 9B. The remaining parts in FIGS. 1A and 1B are the same as those of FIGS. 9A and 9B. The same reference numerals in FIGS. 9A and 9B denote the same parts as in FIGS. 1A and 1B, and a detailed description thereof will be omitted. Color filters are independently arranged for even and odd fields of interlaced scanning in a solid-state image pickup element 101, as shown in FIG. 4. Ye and Cy are read from VOUT1 every other pixel, and Mg and G are read from VOUT2 every other pixel.

An operation of the above arrangement will be described below.

As previously described, outputs from memories (1Hs) 108 and 109 are subjected to the coincidence of Ye, Cy, G and Mg components and an operation represented by matrix (1) in a first coincidence and matrix circuit 112, thereby obtaining R, G, and B signals. The outputs from the memories 108 and 109 are also supplied to the wide-band signal generation circuit 113. A Ye (yellow) component is constituted by red and green of the three primaries, a Cy (cyan) component is constituted by green and blue of the three primaries, and an Mg (magenta) component is constituted by red and blue of the three primaries. For this reason, the wide-band signal generation circuit 113 generates a G–B component in accordance with the following operations:

$$Ye-Mg=(R+G)-(R+B)=G-B$$

$$2*G-Cy=2G-(G+B)=G-B \qquad (3)$$

Figure 3A:
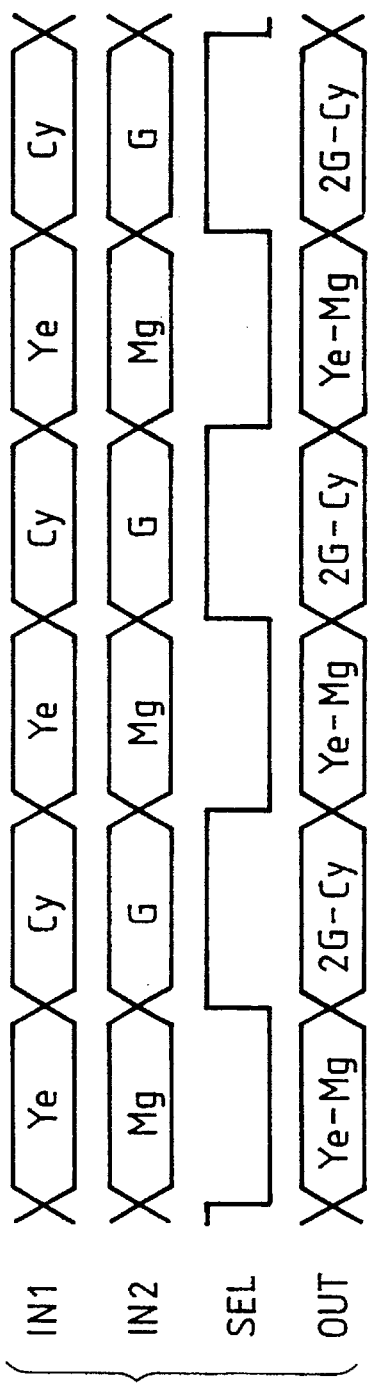
FIGS. 3A and 3B are timing charts showing the operation of the circuit in FIG. 2.

FIG. 2 shows the internal structure of the wide-band signal generation circuit 113, and its timing chart is shown in FIG. 3A. As shown in FIGS. 2 and 3A, in inputs IN1 and IN2 of the two systems, Ye is phase-locked with Mg, and Cy is phase-locked with G. For this reason, a subtracter 201 performs a Ye–Mg operation, and a subtracter 203 performs a 2*G–Cy operation. In this case, the grain of the G component is doubled by a multiplier 202. Outputs from the subtracters 201 and 203 are supplied to a selector 204. Ye–Mg and 2*G–Cy are output every other pixel in accordance with switching by a control signal SEL, thereby extracting G–B. No horizontal operation is performed in generation of G–B, so that the band is not degraded. Note that the levels of the respective pixels must be aligned with each other, and false colors may be suppressed, as needed.

When the subtracter 117 subtracts the output from the wide-band signal generation circuit 113 from the G component as the output from the coincidence and matrix circuit 112, i.e., $$G-(G-B)=B \qquad (4)$$

a wide-band B signal is obtained. When the adder 116 adds the B component as the output from the coincidence and matrix circuit 112 and the output from the wide-band signal generation circuit 113, i.e., $$B+(G-B)=G \qquad (5)$$

a wide-band G signal is obtained.

The R, G and B components thus obtained are supplied to a white balance circuit (WB). The gains of the R and B components are controlled with reference to the G component, thereby obtaining a good white balance.

Figure 6:
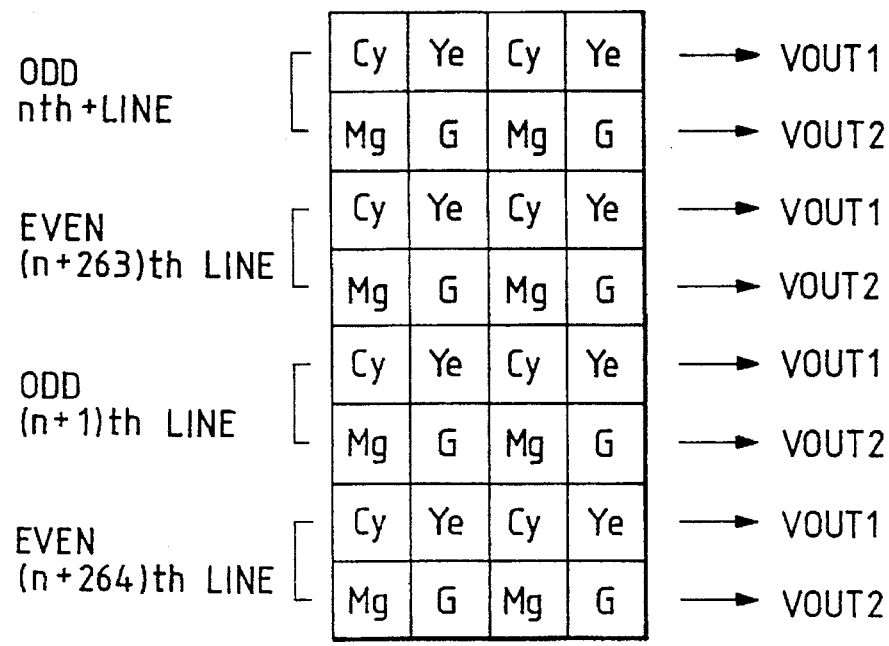
FIG. 6 is a view showing the pixel layout of a CCD used in the second embodiment.

The second embodiment of the present invention will be described with reference to FIG. 5 which comprised of FIGS. 5A and 5B. Referring to FIGS. 5A and 5B, a subtracter 516 and an adder 517 which serve as a mixing means are used in place of the adder 116 and the subtracter 117 in FIGS. 1A and 1B. Color filters are independently arranged for even and odd fields of interlaced scanning in a solid-state image pickup element 101, as shown in FIG. 6. Cy and Ye are read from VOUT1 every other pixel, and Mg and G are read from VOUT2 every other pixel. The phase relationship between the VOUT1 and VOUT2 pixels is different from that in the first embodiment.

An operation of the above arrangement will be described below. Outputs from memories (1Hs) 108 and 109 are subjected to the coincidence of Ye, Cy, Mg, and G components and an operation represented by matrix (1) in a first coincidence and matrix circuit 112, thereby obtaining R, G, and B signals as in the operation in FIGS. 1A and 1B. The outputs from the memories 108 and 109 are also supplied to a wide-band signal generation circuit 113. A Ye (yellow) component is constituted by red and green of the three primaries, a Cy (cyan) component is constituted by green and blue of the three primaries, and an Mg (magenta) component is constituted by red and blue of the three primaries. For this reason, the wide-band signal generation circuit 113 generates a G–R component in accordance with the following operations:

$$Cy-Mg=(G+B)-(R+B)=G-R$$

$$2*G-Ye=2G-(G+B)=G-R \quad (6)$$

Figure 3B:
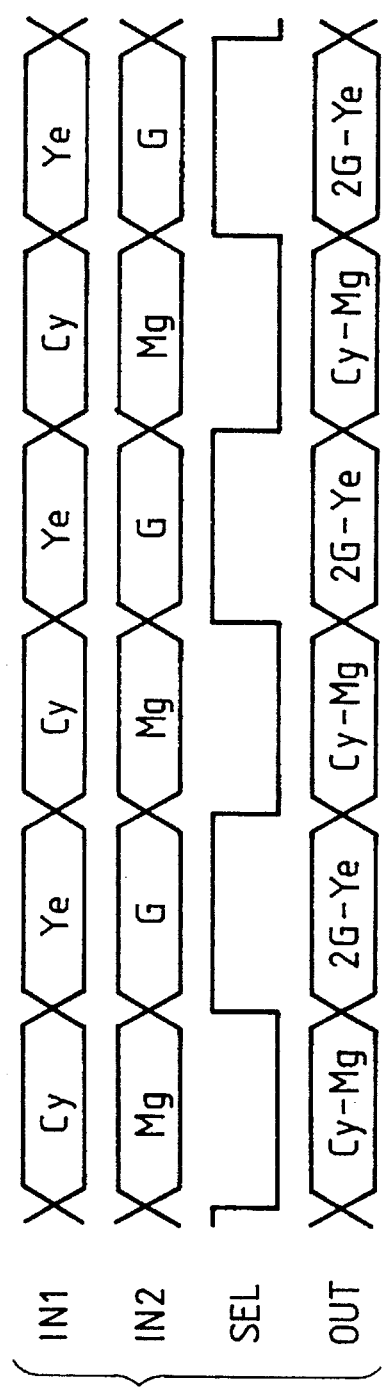

The internal arrangement of the wide-band signal generation circuit 113 is identical to that of the first embodiment in FIG. 2, but the operation is performed as shown in FIG. 3B. As shown in FIG. 3B, in inputs IN1 and IN2 of the two systems, Cy is phase-locked with Mg, and Ye is phase-locked with G. For this reason, a subtracter 201 performs a Cy–Mg operation, and a subtracter 203 performs a 2 *G–Ye operation. In this case, the grain of the G component is doubled by a multiplier 202. Outputs from the subtracters 201 and 203 are supplied to a selector 204. Cy–Mg and 2 *G–Ye are output every other pixel in accordance with switching by a control signal SEL, thereby extracting G–R. No horizontal operation is performed in generation of G–R, so that the band is not degraded. Note that the levels of the respective pixels must be aligned with each other, and false colors may be suppressed, as needed.

When the subtracter 516 subtracts the output from the wide-band signal generation circuit 113 from the G component as the output from the coincidence and matrix circuit 112, i.e., $$G-(G-R)=R \quad (7)$$

a wide-band R signal is obtained. When the adder 517 adds the R component as the output from the coincidence and matrix circuit 112 and the output from the wide-band signal generation circuit 113, i.e., $$R+(G-R)=G \quad (8)$$

a wide-band G signal is obtained.

The subsequent operation and processing of the luminance signal are the same as those in the first embodiment.

Figure 7:
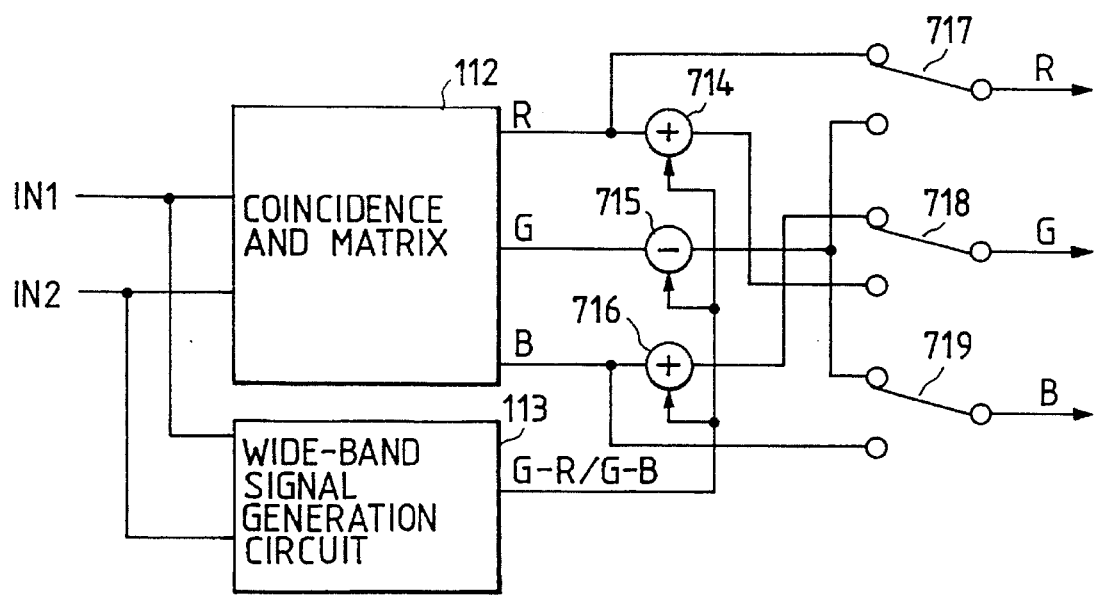
FIG. 7 is a diagram showing the third embodiment of the present invention.
Figure 8:
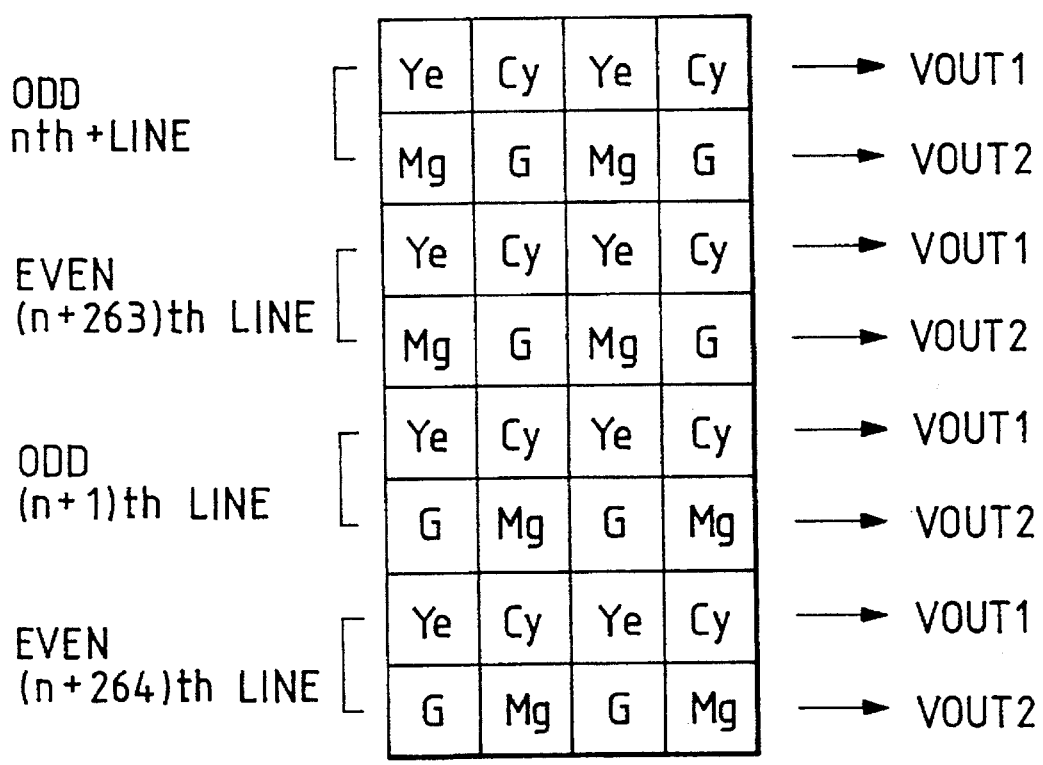
FIG. 8 is a view showing the pixel layout of a CCD used in the third embodiment.

The third embodiment of the present invention will be described with reference to FIG. 7. FIG. 7 shows only a first coincidence and matrix circuit 112, a wide-band signal generation circuit 113, and a mixing means as the peripheral device thereof. The remaining arrangement in FIG. 7 is identical to that of the first and second embodiments. Color filters are independently arranged for even and odd fields of interlaced scanning in a solid-state image pickup element 101, as shown in FIG. 8. Ye and Cy are read from VOUT1 every other pixel, and Mg and G are read from VOUT2 every other pixel. The color filter layout in the third embodiment is different from those of the first and second embodiments. The Mg and G components are reversed every other line.

The wide-band signal generation circuit 113 alternately performs the operations in FIGS. 3A and 3B because the Mg and G components are alternately reversed every other line. The wide-band signal generation circuit 113 generates G–R and G–B components every other line. The internal circuit arrangement of the wide-band signal generation circuit 113 is identical to that (FIG. 2) of the first and second embodiments.

An operation of the above arrangement will be described below.

A subtracter 715 in FIG. 7 subtracts an output from the wide-band signal generation circuit 113 from the G component as an output from the coincidence and matrix circuit 112 to obtain a wide-band R signal by equation (7). An adder 714 adds the R component as the output from the coincidence and matrix circuit 112 and the output from the wide-band signal generation circuit 113 to obtain a wide-band G signal by equation (8).

To the contrary, in the next TV line, the subtracter 715 subtracts the output from the wide-band signal generation circuit 113 from the G component as the output from the coincidence and matrix circuit 112 to obtain a wide-band B signal as follows:

$$G-(G-B)=B \quad (9)$$

The adder 716 adds the B component as the output from the coincidence and matrix circuit 112 and the output from the wide-band signal generation circuit 113 to obtain a wide-band G signal as follows:

$$B+(G-B)=G \quad (10)$$

Although the operations for generating the wide-band R, G, and B components every other line are different from those in the first and second embodiments, the difference can be corrected by switching inputs to selectors 717 to 719 in units of lines. The subsequent operation of the third embodiment is the same as those of the first and second embodiments.

As has been described above, according to the present invention, in an image pickup device, operations accompanying no horizontal processing are performed to obtain wide-band components in generation of R, G, and B components by a matrix operation of outputs from an image pickup element. The resultant wide-band components are mixed with the R, G, and B components, thereby obtaining wide-band digital R, G, and B outputs coping with multimedia applications. Therefore, a high-quality image free from color blurring at a high resolution can be obtained.

What is claimed is:

1. An image pickup device comprising:

matrix operation means for performing a matrix operation on a video signal from an image pickup element to generate R (red), G (green), and B (blue) signals;

wide-band signal generation means for performing signal processing excluding horizontal processing for the video signal to generate a wide-band signal; and mixing means for mixing the wide-band signal to the R, G, and B signals to generate wide-band R, G, and B signals.

2. An image pickup device which outputs a first video signal including first and second color component signals from an image pickup element every other pixel and a second video signal including third and four color component signals from said image pickup element every other pixel, converts the first and second video signals into a first digital video signal including first and second digital color component signals and a second digital video signal including third and fourth digital color component signals, and performs signal processing for the first and second digital video signals to output a video luminance signal, a video color signal, and digital R, G, and B signals, comprising:

matrix operation means for coinciding the first and second digital video signals and performing a matrix operation on the first to fourth digital color component signals to generate R, G, and B signals; and mixing means for generating a wide-band signal component from the first and third color component signals and a wide-band signal component from the second and fourth color component signals and mixing the wide-band signal components with the R, G, and B signals to generate wide-band R, G, and B signals.

3. A device according to claim 2, wherein the first color component signal output from said image pickup element is a Ye (yellow) component signal, the second color component signal is a Cy (cyan) component signal, the third color component signal is an Mg (magenta) component signal, and the fourth color component signal is a G component signal.

4. A device according to claim 2, wherein the first color component signal output from said image pickup element is a Cy component signal, the second color component signal is a Ye component signal, the third color component signal is an Mg component signal, and the fourth color component signal is a G component signal.

5. A device according to claim 2, wherein in one horizontal period of a television signal, the first color component signal output from said image pickup element is a Cy component signal, the second color component signal is a Ye component signal, the third color component signal is an Mg component signal, and the fourth color component signal is a G component signal, and in next one horizontal period of the television signal, the first color component signal output from said image pickup element is a Ye component signal, the second color component signal is a Cy component signal, the third color component signal is an Mg component signal, and the fourth color component signal is a G component signal.

* * * * *

UNITED STATES PATENT AND TRADEMARK OFFICE
CERTIFICATE OF CORRECTION

PATENT NO. : 5,568,193

DATED : October 22, 1996

INVENTOR(S): Norihiro Kawahara

It is certified that error appears in the above-identified patent and that said Letters Patent is hereby corrected as shown below:

Col. 2, line 21, change "Y=0.3R+0.11B" to -- Y=0.3R + 0.59G + 0.11B --.

Signed and Sealed this

Thirteenth Day of May, 1997

Attest:

BRUCE LEHMAN

*Attesting Officer*  *Commissioner of Patents and Trademarks*